UNITED STATES PATENT OFFICE.

CARL KRAUT, OF WASHINGTON, DISTRICT OF COLUMBIA.

LUMINOUS PAINT.

SPECIFICATION forming part of Letters Patent No. 518,320, dated April 17, 1894.

Application filed January 4, 1894. Serial No. 495,713. (No specimens.)

*To all whom it may concern:*

Be it known that I, CARL KRAUT, a subject of the Emperor of Germany, residing at Washington, in the District of Columbia, have invented a new and useful Method of Preparing Luminous Painted Surfaces, of which the following is a specification.

This invention relates to a method of preparing luminous painted surfaces, and it has for its object to provide a new and useful method of this character involving a composition of matter, or at least a combination of compositions that secure the desired results.

To this end the main and primary object of the present invention is to provide a luminous painted surface which can be applied to pictures in oil or water colors, for the purpose of imparting to such pictures an illuminated appearance in the dark, as well as causing them to emit a sufficient light to illuminate a room or portion of a room to enable a person to read, write, &c., or such painted surface may be applied to any desired object for the same purpose.

With these and other objects in view, which will readily appear as the nature of the invention is better understood, the same consists in the method of preparing luminous painted surfaces as hereinafter described.

In preparing my improved luminous painted surface for application to a picture or other object, I first employ a ground-composition composed of five and one half parts of zinc oxide, one part of lead carbonate (white-lead), two and one half parts of pure linseed oil, and one part of Venetian turpentine. This composition of matter which forms the ground for the luminous surface is suitably applied to the picture or other object which is to carry the paint, and after such ground composition has become dry the same is covered with a second luminous composition repeatedly painted thereover, said ground composition contributing to the durability and the white color of the completed luminous painted surface, and therefore forming an essential integral part of the completed surface to increase and render more permanent the luminosity of the luminous composition which will now be referred to.

The luminous-composition of the painted surface, which is painted over the first ground composition, is composed of four parts of calcium fluoride in a pulverized state and heated to a red heat; one and one-half parts of ground oyster-shells, twice heated to a red heat and also pulverized; three and one half parts of dammar-gum, and one part of Venetian turpentine.

After the luminous composition has been allowed to dry on the object on which it is placed, the luminous painted surface will have been completed and will possess the light-giving properties previously noted, and relative to the luminous character of this surface it is to be noted that exposure to the sun or daylight greatly increases the luminous properties thereof to render the same useful as a light-giving substance.

The utility and many advantages of a luminous paint of the character described will readily suggest themselves to those skilled in the art.

Having thus described the invention, what is claimed, and desired to be secured by Letters Patent, is—

The herein-described method of preparing a luminous painted surface which consists in the application to an object of a ground composition composed of zinc oxide, carbonate of lead, linseed oil, and Venetian turpentine; and coating the ground composition with a luminous composition composed of calcium fluoride, heated ground oyster-shells, dammar-gum and Venetian turpentine, substantially as described.

In testimony that I claim the foregoing as my own I have hereto affixed my signature in the presence of two witnesses.

CARL KRAUT.

Witnesses:
JOHN H. SIGGERS,
E. G. SIGGERS.